(12) United States Patent
Huang et al.

(10) Patent No.: US 9,058,744 B2
(45) Date of Patent: Jun. 16, 2015

(54) IMAGE BASED DETECTING SYSTEM AND METHOD FOR TRAFFIC PARAMETERS AND COMPUTER PROGRAM PRODUCT THEREOF

(75) Inventors: Chung-Hsien Huang, Tainan (TW); Ruei-Cheng Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1132 days.

(21) Appl. No.: 13/046,689

(22) Filed: Mar. 11, 2011

(65) Prior Publication Data

US 2012/0148094 A1    Jun. 14, 2012

(30) Foreign Application Priority Data

Dec. 9, 2010    (TW) ............................. 99143063 A

(51) Int. Cl.
  *G06K 9/00*    (2006.01)
  *G08G 1/054*    (2006.01)
(52) U.S. Cl.
  CPC ............ *G08G 1/054* (2013.01); *G06K 9/00785* (2013.01)
(58) Field of Classification Search
  USPC ........... 382/103, 104, 107; 348/135, 148, 149
  See application file for complete search history.

(56) References Cited

U.S. PATENT DOCUMENTS

| | | | | |
|---|---|---|---|---|
| 5,761,326 A * | 6/1998 | Brady et al. | ................... | 382/103 |
| 5,809,161 A * | 9/1998 | Auty et al. | ................... | 382/104 |
| 5,999,877 A | 12/1999 | Takahashi et al. | | |
| 6,430,303 B1 * | 8/2002 | Naoi et al. | ................... | 382/104 |
| 6,760,061 B1 * | 7/2004 | Glier et al. | ................... | 348/149 |

(Continued)

FOREIGN PATENT DOCUMENTS

| | | |
|---|---|---|
| CN | 1379359 A | 11/2002 |
| CN | 1897015 A | 1/2007 |

(Continued)

OTHER PUBLICATIONS

Taiwan Patent Office, Office Action, Patent Application Serial No. TW099143063, Oct. 17, 2013, Taiwan.

(Continued)

*Primary Examiner* — Vikkram Bali
(74) *Attorney, Agent, or Firm* — Lin & Associates IP, Inc.

(57) ABSTRACT

An image-based detecting system for traffic parameters first sets a range of a vehicle lane for monitoring control, and sets an entry detection window and an exit detection window in the vehicle lane. When the entry detection window detects an event of a vehicle passing by using the image information captured at the entry detection window, a plurality of feature points are detected in the entry detection window, and will be tracked hereafter. Then, the feature points belonging to the same vehicle are grouped to obtain at least a location tracking result of single vehicle. When the tracked single vehicle moves to the exit detection window, according to the location tracking result and the time correlation through estimating the information captured at the entry detection window and the exit detection window, at least a traffic parameter is estimated.

13 Claims, 18 Drawing Sheets

(56) References Cited

U.S. PATENT DOCUMENTS

| | | | |
|---|---|---|---|
| 6,999,004 B2 | | 2/2006 | Comaniciu et al. |
| 7,327,855 B1* | | 2/2008 | Chen .......................... 382/104 |
| 7,460,691 B2* | | 12/2008 | Ng et al. ...................... 382/107 |
| 7,577,274 B2 | | 8/2009 | Brodsky |
| 7,623,681 B2* | | 11/2009 | Miyahara .................... 382/104 |
| 8,108,119 B2* | | 1/2012 | Southall et al. ............... 701/96 |
| 8,116,523 B2* | | 2/2012 | Amagasaki .................. 382/103 |
| 8,594,370 B2* | | 11/2013 | Schamp et al. .............. 382/103 |
| 2008/0088707 A1* | | 4/2008 | Iwaki et al. ................ 348/208.1 |
| 2008/0273752 A1* | | 11/2008 | Zhu et al. .................... 382/103 |
| 2009/0309966 A1* | | 12/2009 | Chen et al. .................. 348/135 |
| 2010/0054538 A1* | | 3/2010 | Boon .......................... 382/104 |
| 2010/0322476 A1* | | 12/2010 | Kanhere et al. ............. 382/103 |

FOREIGN PATENT DOCUMENTS

| | | | |
|---|---|---|---|
| CN | 1979087 A | 6/2007 | |
| CN | 101059529 A | 10/2007 | |
| CN | 101131796 A | 2/2008 | |
| CN | 101308606 A | 11/2008 | |
| CN | 1013852997 A | 3/2009 | |
| CN | 101510358 A | 8/2009 | |
| CN | 102013159 A | 4/2011 | |
| JP | 2004145495 A | 5/2004 | |
| JP | 2008299458 A | 12/2008 | |
| TW | 502229 B | 9/2002 | |
| TW | 200529093 A | 9/2005 | |
| TW | I270022 | 1/2007 | |
| TW | 200802200 A | 1/2008 | |
| TW | 200806035 A | 1/2008 | |
| TW | I298857 | 7/2008 | |
| TW | 200905619 A | 2/2009 | |
| TW | 201001338 A | 1/2010 | |
| WO | 2010010926 A1 | 1/2010 | |

OTHER PUBLICATIONS

B.-F. Wu, C.-C. Kao, C.-C. Lin, C.J. Fan, and C.-J. Chen, "The vision-based vehicle detection and incident detection system in Hsueh-Shan tunnel," in Proceedings of IEEE International Symposium on Industrial Electronics, pp. 1394-1399, 2008.

Z. Liu, Y. Chen and Z. Li, "Camshift-based real-time multiple vehicle tracking for visual traffic surveillance," in Proceeding of World Congress on Computer Science and Information Engineering, vol. 5, pp. 477-482. 2009.

Y.-H. Lee and Y.T. Lee, "A fast algorithm for measuring vehicle traffic parameters," in Proceedings of International Conference on Machine Learning and Cybernetics, vol. 6, pp. 3061-3066, 2008.

D. Lee and Y. Park, "Measurement of traffic parameters in image sequence using spatio-temporal information," Measurement Science and Technology, vol. 19, No. 11, 2008.

J.-C. Tai, S.-T. Tseng, C.P. Lin and K.T. Song, "Real-time image tracking for automatic traffic monitoring and enforcement applications," Image and Video Computing, vol. 22, No. 6, pp. 485-501, 2004.

D. M. Ha, J.-M. Lee and Y.-D. Kim, "Neural-edge-based vehicle detection and traffic parameter extraction," Image and Video Computing, vol. 22, No. 11, pp. 899-907, 2004.

J. Yang Y. Wang, G. Ye, A. Sowmya, B. Zhang, and J. Xu, "Feature clustering for vehicle detection and tracking in road traffic surveillance," In Proceedings of IEEE International Conference on Image Processing, pp. 1145-1148, 2009.

C. Harris and M. Stephens, "A Combined Corner and Edge Detector," in Proceedings of the 4th Alvey Vision Conference, pp. 147-151, 1988.

China Patent Office, Office Action, Patent Application Serial No. CN201010606200.3, Dec. 4, 2013, China.

* cited by examiner

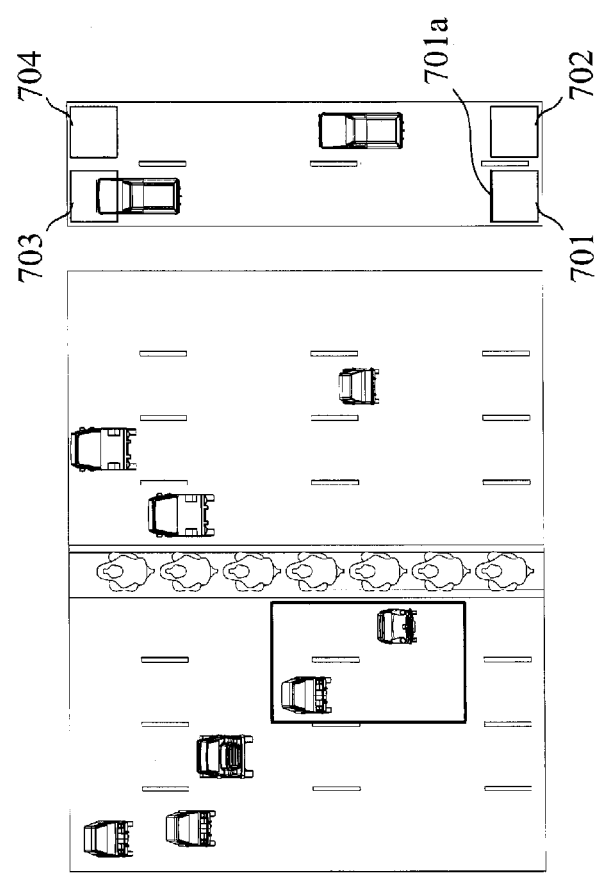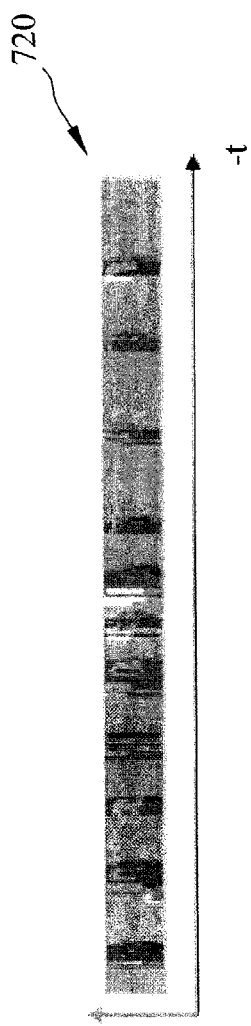
FIG. 7A
FIG. 7B

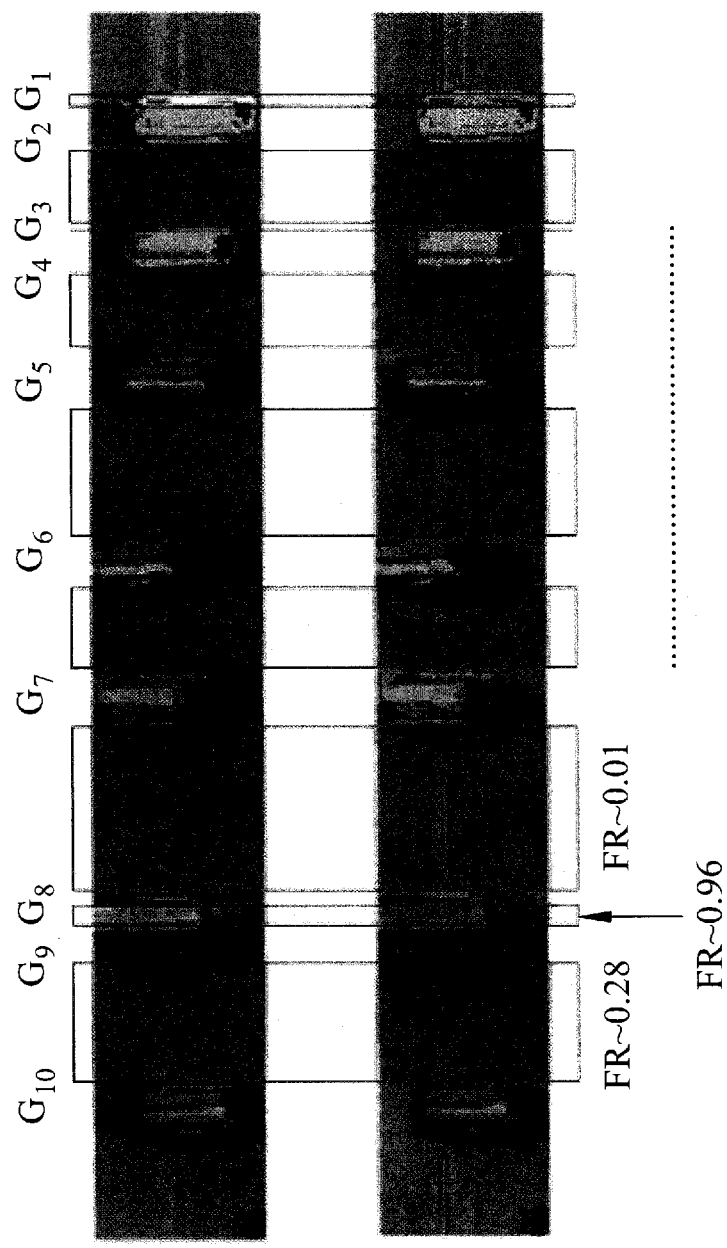

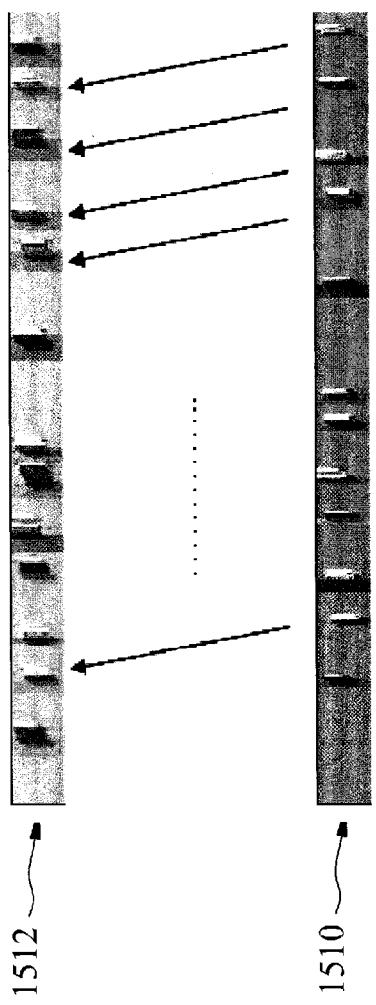
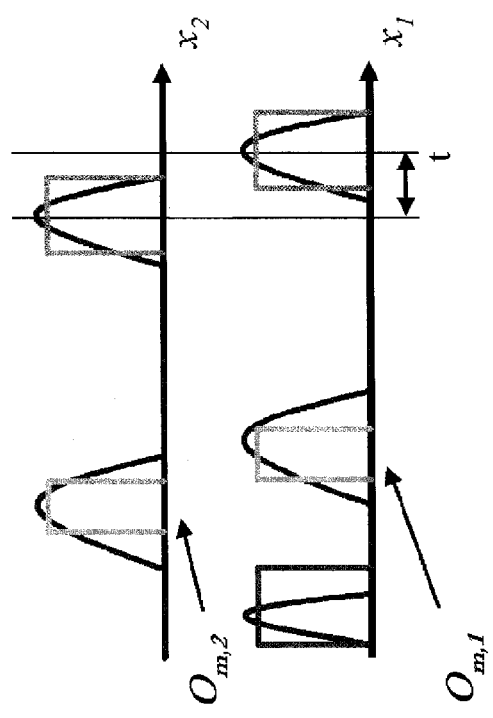
FIG. 15A
FIG. 15B

IMAGE BASED DETECTING SYSTEM AND METHOD FOR TRAFFIC PARAMETERS AND COMPUTER PROGRAM PRODUCT THEREOF

TECHNICAL FIELD

The disclosure generally relates to an image-based detecting system and method for traffic parameters and computer program product thereof.

BACKGROUND

Real-time traffic information detection may provide the latest information on the traffic jam, traffic accident, estimated delay and alternative detour to the drivers, and assists the drivers to reset a new route and to estimate the arrival time through detected and estimated traffic information when a traffic jam occurs. Take a vehicle as an example. The traffic parameters, such as, (1) traffic flow density (congestion situation) and vehicle counts can be used to monitor the traffic condition on the section of a road or at intersection, (2) stalling time, queue length and average speed can be used to optimize the traffic light timing control, (3) single vehicle speed, lane change and safety distance can be used to warn rule-violating drivers, and (4) temporary parking event can be used to fast evacuate the jam caused by accidents.

In comparison with electromagnetic induction circles, radar speed detection guns and infra-red sensor, the photography-based camera detector has the advantages of obtaining a variety of information and detecting a plurality of lanes simultaneously. The vision-based traffic parameter detection techniques may be categorized as detection methods based on background subtraction and based on virtual wires. The background subtraction based detection method is shown as the exemplar in FIG. 1. Through image calibration technique, region of interest (ROI) calibration 120 is performed on inputted image frame 110, and background subtraction 130 is performed through background subtraction or frame difference method to detect the moving object. Then, the object tracking technique is used to perform object tracking 140, such as, tracking a vehicle. Finally, traffic parameter estimation 150 is performed, such as, vehicle count or speed estimation.

For the prior arts on background subtraction based detection methods, such as some methods to detect the edges of the captured digital image and learn the edges to capture the part of moving object for shadow removal and labeling connected elements, and then to perform region merge and vehicle tracking to obtain the traffic parameters. Some methods use background subtraction to generate the difference image representing moving object, divide the moving object into a plurality of regions, and analyze the validity and invalidity of the regions in order to eliminate the invalid regions and cluster valid regions for moving object tracking. Some methods use the difference between the current image and the background image to detect foreground object, use shadow removal and labeling connected elements to obtain a single vehicle object, and then use color information as object related rule for vehicle tracking. Some methods use two cameras to obtain the signal correlation and treat the displacement at the maximum correlation as the vehicle moving time.

FIG. 2 shows an exemplary schematic view of the virtual wire based detection method. Virtual wires 210, such as, detection window or detection line, are set on the image, and triggering conditions are set to determine whether vehicles have passed the virtual detection window, for example, detecting the vehicle entry event 220 and detecting the correlation 230 of entry and exit detection window, for the reference of estimating the traffic parameters, such as, vehicle count or traffic flow density. FIG. 3 shows an exemplary schematic view of setting virtual wires on an image 310, where two virtual wires, i.e., detection windows 332, 334, are set on vehicle lane 340. The temporal correlation between the entry and exit detection windows 332, 334 on the cross-sectional axis 350 of the image may be used to estimate the average speed on vehicle lane 340. In comparison with the background subtraction method, the detection methods based on virtual wires are able to obtain more stable vehicle detection. However, this type of detection methods do not track object, such as, single vehicle speed estimation, lane change and safety distance.

Among the conventional prior arts of virtual wire-based detection methods, some methods analyze the roads from a bird-eye's view map, register the front and rear features of the vehicle as the template, and use pattern-matching to track the vehicle when updating the template to improve the accuracy of traffic flow detection. Some methods set detection windows as the vehicle passing event detection and take the day/night situation into account, such as, edge features of the image is used for day and headlight detection is used for the night. Some methods compute the logarithmic gray-scale spectrum of the ROI of each lane in the captured image, and compute the difference with the reference logarithmic gray-scale spectrum at the high frequency to identify whether vehicles are present at the ROI on vehicle lane to compute the traffic flow.

The contemporary traffic parameter detection technologies usually suffer high cost of installation and maintenance, a large amount of computation, difficulty in vehicle detection caused by environmental light, shadow or unsteady camera, or difficulty in vehicle tracking due to the incapability to precisely determine a region of a single car. Therefore, the traffic parameter detection mechanism must be capable of tracking a single object, improve the precision of object counting and tracking, and improve the stability of traffic parameter estimation through object tracking so as to extract a variety of traffic parameters for the real-time application of traffic surveillance.

SUMMARY

The exemplary embodiments of the disclosure may provide an image-based detecting system and method for traffic parameters and computer program product thereof.

A disclosed exemplary embodiment relates to an image-based detecting system for traffic parameters. The system uses a vehicle lane region of interest (ROI) setting module to set a range on a vehicle lane for surveillance, and set an entry detection window and an exit detection window on this vehicle lane. When a vehicle passes an entry detection window, an event detection module uses the captured entry window image to detect the vehicle passing event, and a feature point detecting and tracking module performs feature detection in the entry detection window and performs feature tracking along the time. Then, a feature grouping module groups a plurality of feature points of a vehicle into a group and obtains at least a location tracking result of a single vehicle. When the tracked at least a single vehicle moves to the exit detection window, a traffic parameter estimation module estimates at least a traffic parameter according to the vehicle location tracking result and through estimating the temporal correlation of the information captured between the entry detection window and the exit detection window.

Another disclosed exemplary embodiment relates to an image-based detecting method for traffic parameters. The method comprises: setting a range on a vehicle lane for surveillance, and setting an entry detection window and an exit detection window in the vehicle lane; detecting whether an event of a vehicle passing occurs by using the image information captured at the entry detection window; when an event of a vehicle passing being detected, a plurality of feature points being detected in the entry detection window, and the plurality of feature points being tracked along the time hereafter; then, the feature points belonging to the same vehicle being grouped to obtain at least a location tracking result of a single vehicle; and when the tracked single vehicle moving to the exit detection window, at least a traffic parameter being estimated according to the location tracking result and the temporal correlation through estimating the information captured at the entry detection window and the exit detection window.

Yet another disclosed exemplary embodiment relates to a computer program product of an image-based detecting for traffic parameters. The computer program product comprises a memory and an executable computer program stored in the memory. The computer program is executed by a processor to perform: setting a range on a vehicle lane for surveillance, and setting an entry detection window and an exit detection window in the vehicle lane; detecting whether an event of a vehicle passing occurs by using the image information captured at the entry detection window; when an event of a vehicle passing being detected, a plurality of feature points being detected in the entry detection window, and the plurality of feature points being tracked along the time hereafter; then, the feature points belonging to the same vehicle being grouped to obtain at least a location tracking result of a single vehicle; and when the tracked single vehicle moving to the exit detection window, at least a traffic parameter being estimated according to the location tracking result and the temporal correlation through estimating the information captured at the entry detection window and the exit detection window.

The foregoing and other features, aspects and advantages of the exemplary embodiments will become better understood from a careful reading of a detailed description provided herein below with appropriate reference to the accompanying drawings.

BRIEF DESCRIPTION OF THE DRAWINGS

FIGS. 7A-7B show an exemplary schematic view of an actual vehicle passing event detection, consistent with certain disclosed embodiments

FIGS. 14A-14B show an exemplary schematic view of foreground rate computation, consistent with certain disclosed embodiments.

FIGS. 15A-15B show an exemplary schematic view of average traffic time estimation method, consistent with certain disclosed embodiments.

DETAILED DESCRIPTION OF THE EXEMPLARY EMBODIMENTS

The exemplary embodiments provide an image-based detecting technique for traffic parameters. The traffic parameter detecting technique is based on the virtual wire detection method, and adopting a layered grouping technique for feature points to improve the accuracy of counting and tracking of vehicles and endows with the capability of tracking a single vehicle. In addition, the exemplary embodiments uses the vehicle tracking result to improve the stability of traffic parameter estimation, such as, average speed, of the temporal correlation analysis on entering and exiting detection windows. The following uses vehicles as exemplar to describe the exemplary embodiment for traffic parameter detection.

When an event for vehicle passing occurs, the exemplary embodiments perform detection of a plurality of feature points in the region of the entry detection window, and tracks the these feature points in the subsequent images. By estimating the maximum temporal correlation of the information captured at entry and exit points, the exemplary embodiments may estimate the traffic parameters of the vehicle lane.

Figure 1:
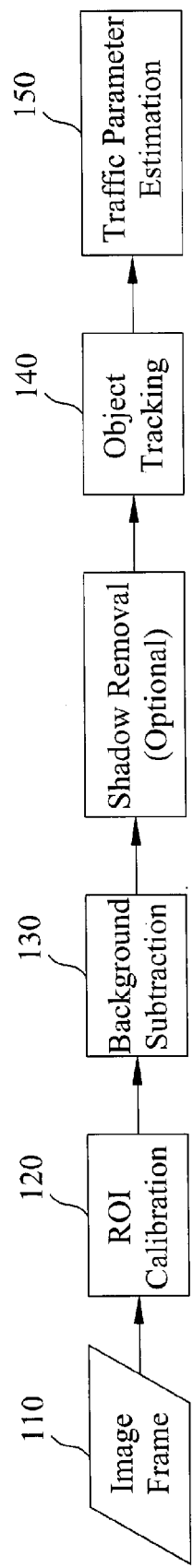
FIG. 1 shows an exemplary schematic view of a detecting technique based on background subtraction.
Figure 2:
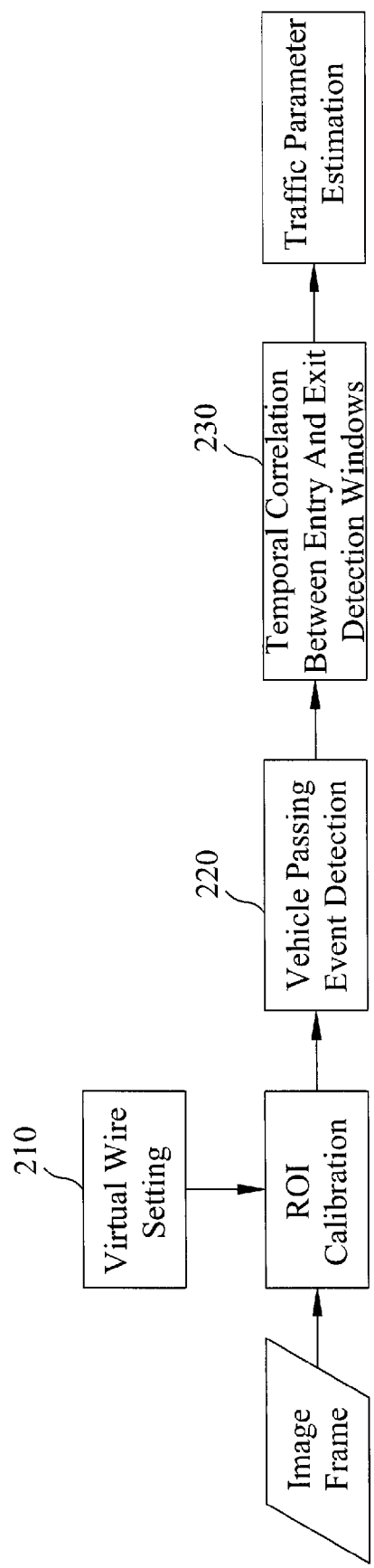
FIG. 2 shows an exemplary schematic view of a detecting technique based on virtual wires.
Figure 3:
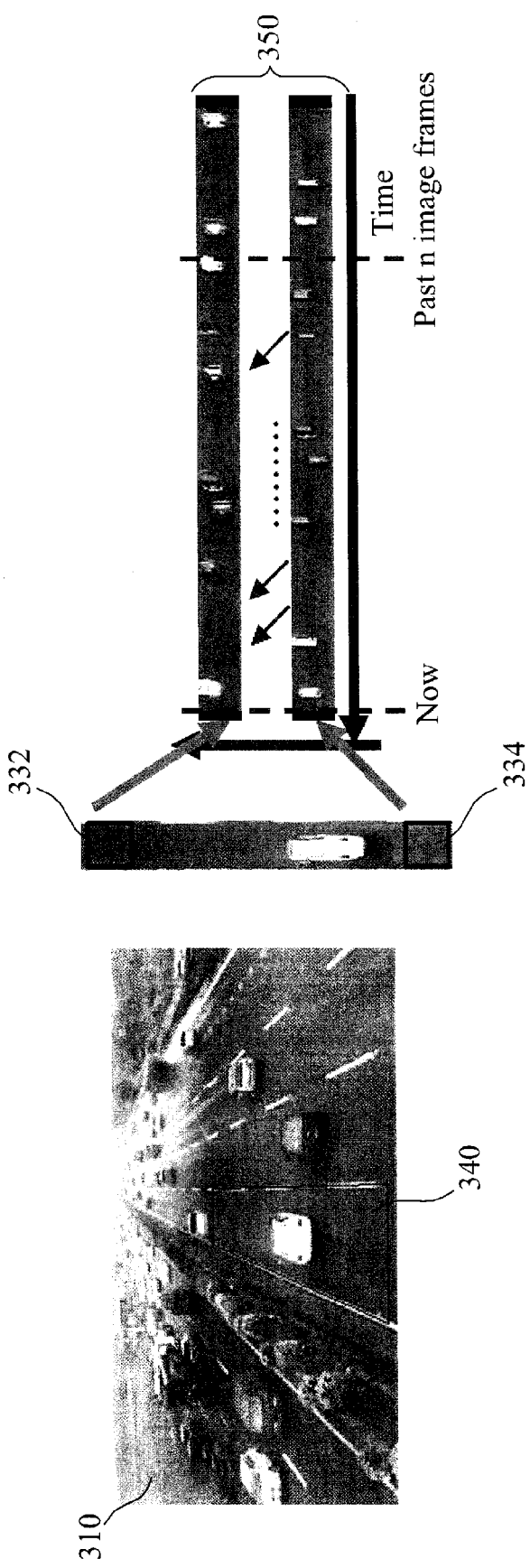
FIG. 3 shows an exemplary schematic view of setting a virtual wire on an image frame.
Figure 4:
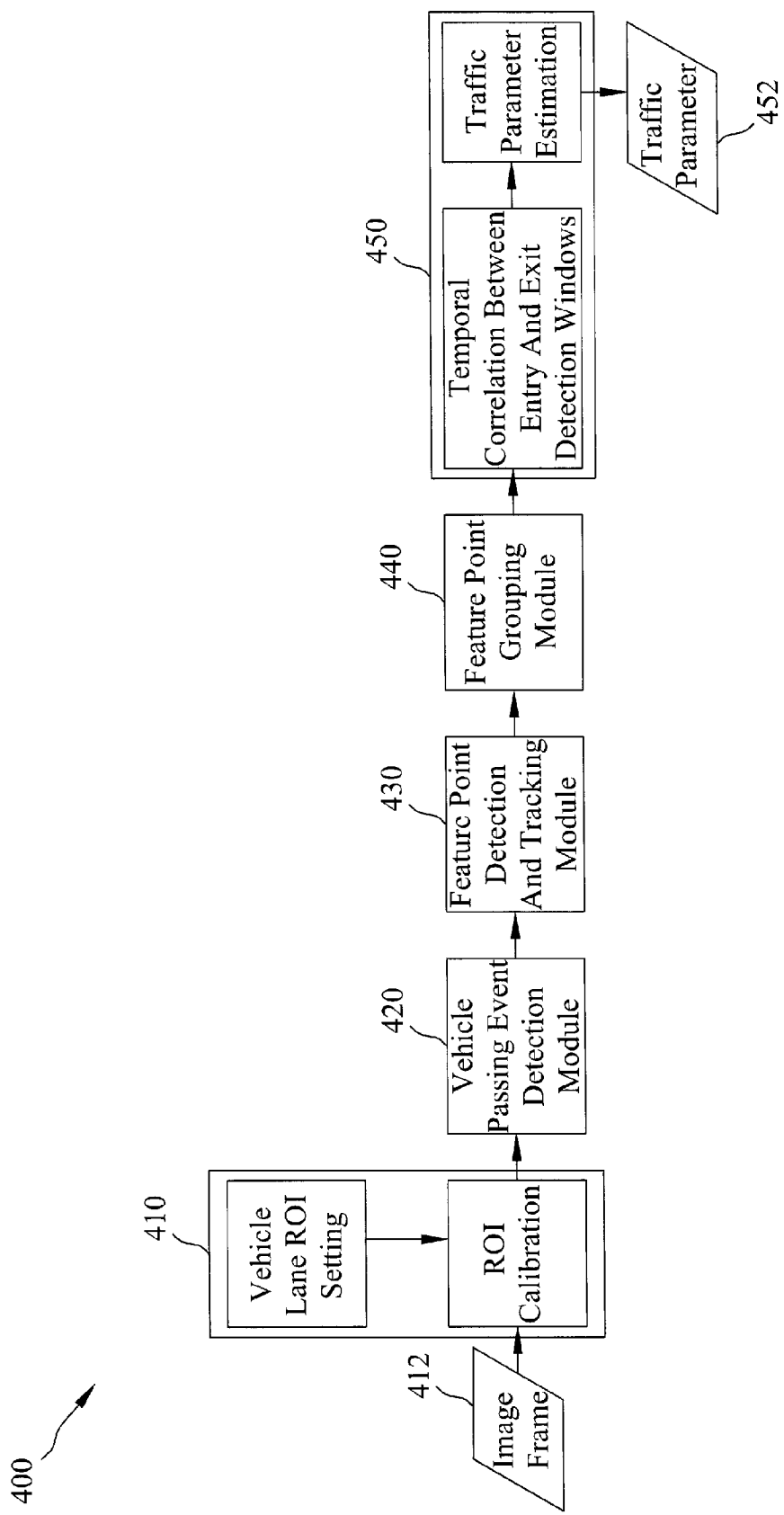
FIG. 4 shows an exemplary schematic view of an image-based detecting system for traffic parameters, consistent with certain disclosed embodiments.

FIG. 4 shows an exemplary schematic view of an image-based detecting system for traffic parameters, consistent with certain disclosed embodiments. In FIG. 4, image-based detecting system 400 for traffic parameters comprises a vehicle lane and region of interest (ROI) setting module 410, a vehicle passing event detection module 420, a feature detection and tracking module 430, a feature grouping module 440 and a traffic parameter estimation module 450.

Traffic parameter detecting system 400 first uses vehicle lane and ROI setting module 410 to perform ROI vehicle lane range setting and ROI calibration, including setting a range on a vehicle lane in an image for surveillance, setting a detection window on the entry point and the exit point of the lane respectively, called entry detection window and exit detection window, and performing ROI calibration on a captured image 412. Traffic parameter detecting system 400 may use or include an image capturing device to continuously capture a plurality of aforementioned images of vehicle lanes. In general, the image capturing device for traffic surveillance, such as, camera, is placed at a higher position to capture image at a depression angle. By using the image information captured at the entry detection window, when vehicle passing event detection module 420 detects an occurrence of vehicle passing event, feature detection and tracking module 430 performs detection of a plurality of feature points in the region of the entry detection windows and tracks the feature points along the time, such as, via optical flow tracking technology. Then, feature grouping module 440 groups the feature points belonging to the same vehicle and obtains at least a location tracking result of a single vehicle, such as, via layered grouping technology of feature points, to track the trajectory of a single vehicle. When a tracked single vehicle moves to the exit detection window, traffic parameter estimation module 450 feeds back the vehicle tracking result information to the exit detection window of the vehicle lane. Then, the temporal correlation of the information captured at the entry detection window and the exit detection window is analyzed to estimate at least a traffic parameter 452, such as, the average speed of the vehicles in a single lane.

Figure 5:
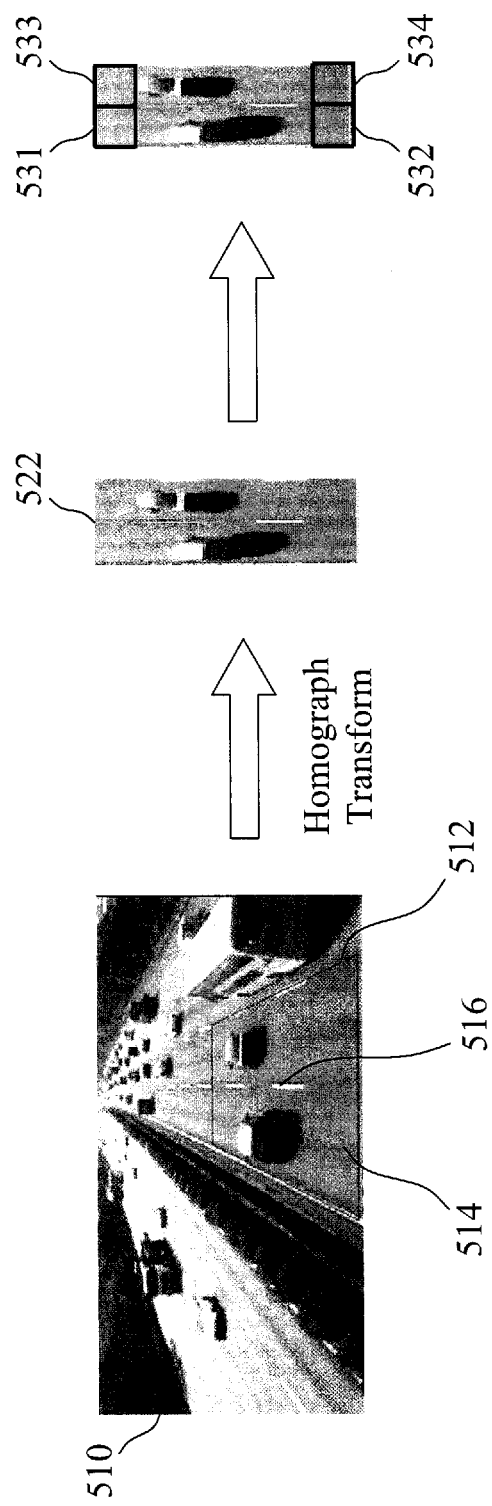
FIGS. 5A-5C show an exemplary schematic view of vehicle lane, ROI setting module selecting detection windows, and ROI calibration, consistent with certain disclosed embodiments.

FIGS. 5A-5C further show an exemplary schematic view of vehicle lane, ROI setting module selecting detection windows, and ROI calibration, consistent with certain disclosed embodiments. FIG. 5A is an exemplary vehicle lane image 510 captured by an image capturing device at an angle of depression. Traffic parameter detecting system 400 sets a range of the vehicle lane to be monitored on image 510, such as, ROI 512 to indicate the range, where the vehicle lane covered by ROI 512 may be one or more lanes. The length of the vehicle lane within ROI 512 is used as the basis for computing the vehicle speed.

Take the current traffic regulation in Taiwan as example. Lane width 514 is 3.75 m in general, lane division line 516 is usually 4 m, and the part of dash line is 6 m. If the image does not show clear lane marking, the field measurement can provide such information. Then, the four vertexes of ROI 512 may be used in homograph transformation to obtain the vertical bird's eye view image 522 of ROI 512, as shown in FIG. 5B. After ROI 512 calibration, a detection window is set at the entry point and the exit point of each lane, shown as the square detection windows 531-534 of FIG. 5C. The length of the detection window is equal to the lane width, and the detection window is used as the basis for subsequent detection of vehicle passing event.

Figure 6:
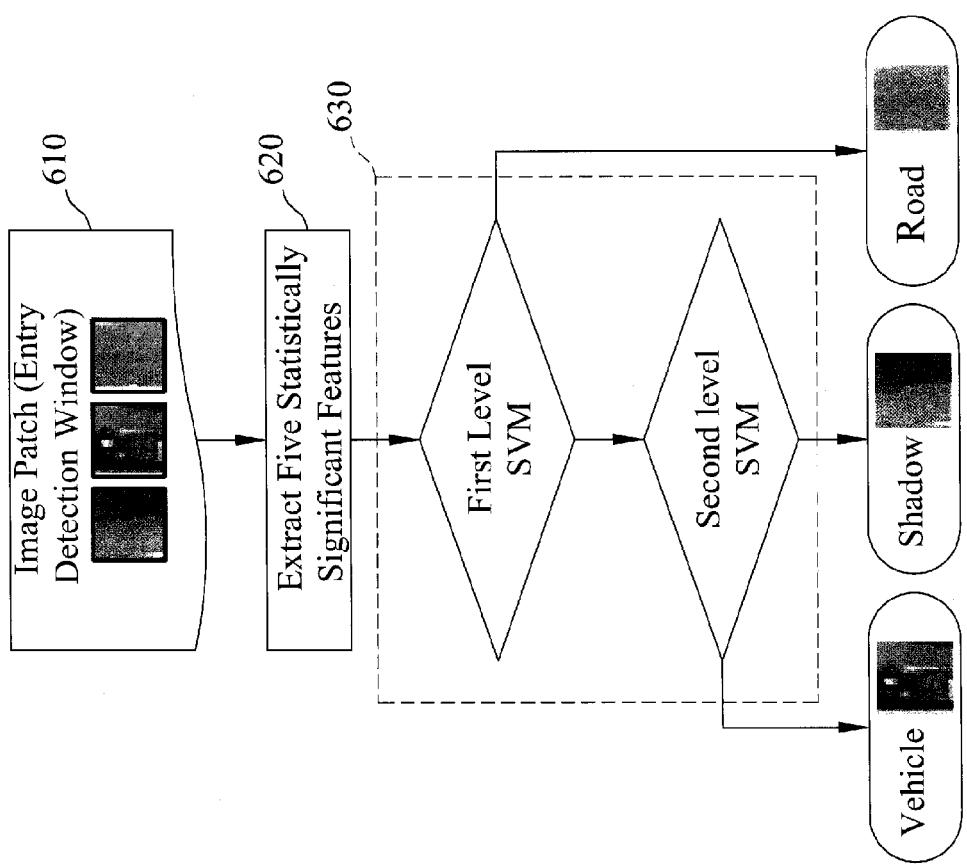
FIG. 6 shows an exemplary schematic view of vehicle passing event detection module that uses a two-level SVM classifier to classify the image obtained by detection window into vehicle, shadow and road, consistent with certain disclosed embodiments.

As shown in FIG. 6, vehicle passing event detection module 420 extracts five statistically significant features from image template 610 obtained from the entry detection window at every time point, marked as 620. Then, a support vector machine (SVM) classifier 630 classifies the image plate into three classes: vehicle, shadow and road. SVM classifier 630 at least includes two levels. The five statistically significant features include at least three features based on gray scale and at least two features based on edges. The three features based on gray scale are standard deviation (STD), 2-STD and entropy. The two features based on edges are gradient magnitude (GM) and edge response.

Vehicle passing event detection module 420 may also include an SVM classifier 630. SVM classifier 630 at least includes a first level SVM and a second level SVM. The first level SVM may classify image template 610 as road and non-road. Those image templatees classified by the first level SVM as non-road class are further classified by the second level SVM as vehicle or shadow. Two-leveled SVM classifier 630 may be designed via manually classifying the massive collection of sample image plates into vehicle, shadow and road and then inputting the labeled training samples to the two-level SVM classifier, that is, by using the extracted two types of features, i.e., gray scale-based and edge-based, to train the first level SVM classifier and the second level SVM classifier.

Through the gray scale-based features, the image plates obtained by the detection window can be classified into color vehicle and road. The three gray scale-based features are defined as follows:

$$\text{Standard deviation } STD = \sqrt{\frac{\sum_{(x,y)\in R}(D(x,y)-\mu)}{N}}$$

where R is the detection window region, N is the total number of pixels within detection window region R, D(x,y) is the gray scale of pixel (x,y) and $\mu$ is the average gray scale of the pixels within detection window region R.

Before computing the second type STD (2-STD), K-Means is used to differentiate detection window region into $R_1$ and $R_2$ with the gray scale as the feature. Then, the following equation is used to compute the 2-STD:

$$2-STD = \sqrt{\frac{1}{N}\left(\sum_{(x,y)\in R_1}(D(x,y)-\mu_1)^2 + \sum_{(x,y)\in R_2}(D(x,y)-\mu_2)^2\right)}$$

where $\mu_1$ and $\mu_2$ are the average gray scale values of $R_1$ and $R_2$ respectively.

The entropy is defined as follows:

$$E = -\sum_{i=0}^{L-1} p(i)\log_2 p(i)$$

where L is the maximum of the gray scale display range of the region, i is each gray scale value within that region and p(i) is the probability of gray scale i.

The features based on edge may be used to reduce the impact of the light and shadow. The two edge-based features, i.e., average GM and edge response (ES), are defined as follows:

$$GM = \frac{\sum_{(x,y)\in R}\left(\sqrt{(D_x(x,y))^2 + (D_y(x,y))^2}\right)}{N}$$

where $D_x$ and $D_y$ are the differential of pixel D(x,y) in the x and y direction respectively.

Before computing ES, an edge test is performed on the image. Assume that $N_E$ is the number of the pixels determined to be edge by the edge test. ES is computed as:

$$ES = N_E/N.$$

The present disclosure inputs around 10,000 training samples to SVM classifier 630, where 96.81% classification correctness rate may be obtained for the first level SVM classifier, and 94.26% classification correctness rate may be obtained for the second level SVM classifier. The actual exemplar of vehicle passing event detection is shown in FIGS. 7A-7B. FIG. 7A shows a traffic image and two lanes 710-711 of interest set by the user, and lanes 710-711 include four detection windows 701-704. For entry detection window 701, the relation between the front-edge pixels (i.e., detection line 701*a*) and the time is taken into account to generate a temporal profile image 720, as shown in FIG. 7B, where x-axis is time with origin 0 as current time and −t indicating the past. The longer the distance to the origin, the longer ago the information is. Y-axis is the pixel information of detection line 701*a* at a specific time. If a vehicle passing event is detected at that time, a color mark is placed on temporal profile image 720 as a label; otherwise, the original pixel color information of the detection line is kept.

When a vehicle passing event occurs at an entry detection window, the feature point detection is performed in that entry detection window as the basis for moving vehicle tracking. The Harris vertex detection technology may be used to obtain m Harris feature points with the maximum response in that entry detection window. Harris vertex detection technology is to observe the gray scale change in a rectangular area by moving the rectangular area of within an image. The change in the rectangular area may be one of the following three types.

Figure 8C:
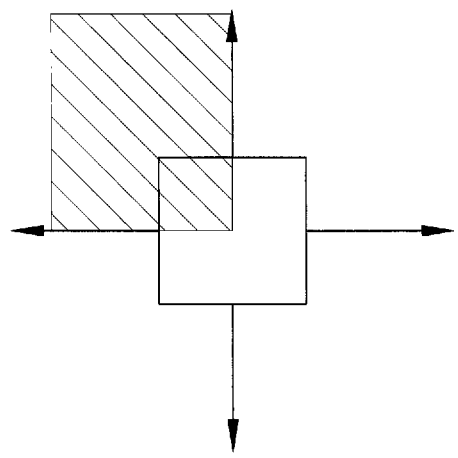
FIGS. 8A-8C show an exemplary schematic view of the three scenarios of the rectangular area moving in an image, consistent with certain disclosed embodiments.
Figure 8B:
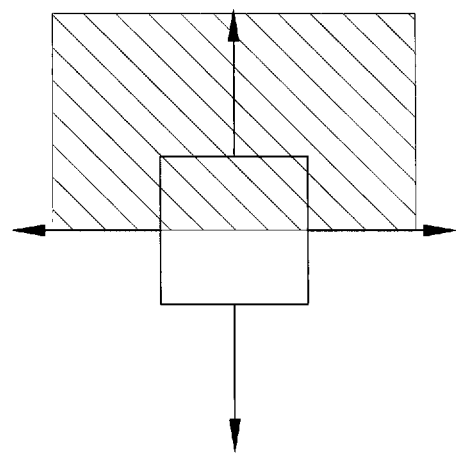
Figure 8A:
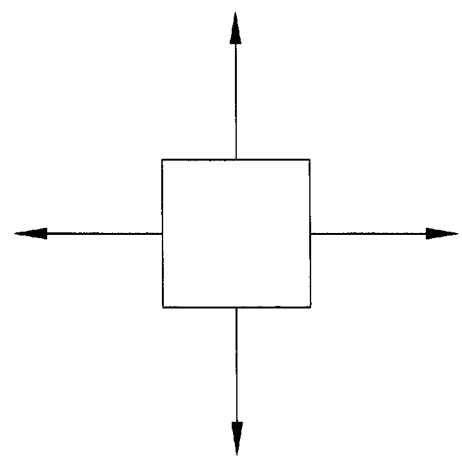

(1) If the gray scale change is approaching flat in the moved rectangular area, the gray scale value would show no obvious change in the rectangular area no matter in which direction the image moves, as shown in FIG. 8A. (2) If the rectangular area moves in the image region having edge or line, a strong gray scale change will be observed if the rectangular area moves in the direction perpendicular to the direction of the edge or line, as shown in FIG. 8B. When the rectangular area moves to the right, the gray scale changes in the right part is significant. (3) When the rectangular area moves in the image region having feature point, any direction of movement will cause great gray scale change in the rectangular area, as shown in FIG. 8C. Whether the rectangular area moves up, down, left or right, the great gray scale change can be observed in the rectangular area.

Accordingly, after the rectangular area moves in each direction, the sum of the changes can be expressed as equation (1):

$$E_{x,y} = \sum_{u,v} w_{u,v} |I_{x+u,y+v} - I_{u,v}| \quad (1)$$

where $w_{u,v}$ is the defined rectangular area. If point (u,v) is inside the rectangular area, $w_{u,v}$ is 1; otherwise, $w_{u,v}$ is 0. $I_{u,v}$ is the gray scale value of point(u,v) in the image, and x and y are the movement displacement in x and y directions respectively.

Equation (1) may be expressed as Taylor expansion and the gradients of image I in x and y directions may be estimated. Then, equation (1) may be further simplified as:

$$E_{x,y} = Ax^2 + 2Cxy + By^2 \quad (2)$$

where $A = \left(\frac{\partial I}{\partial x}\right)^2 w_{u,v}$, $B = \left(\frac{\partial I}{\partial y}\right)^2 w_{u,v}$, $C = \left(\frac{\partial I}{\partial x}\right)\left(\frac{\partial I}{\partial y}\right) w_{u,v}$.

To reduce the impact of noise in the image, the binary $w_{u,v}$ may be replaced by Gaussian function, and equation (2) may be expressed as a matrix:

$$E_{x,y} = (x,y) Z (x,y)^T \quad (3)$$

where Z is a 2×2 symmetrical matrix of gray scale change:

$$Z = \begin{bmatrix} A & C \\ C & B \end{bmatrix}.$$

Let $\lambda_1$ and $\lambda_2$ be the feature values of matrix Z. Based on the values of $\lambda_1$ and $\lambda_2$, the following may be known: (1) if both $\lambda_1$ and $\lambda_2$ are small, the gray scale change in the area is not obvious; (2) if one of $\lambda_1$ and $\lambda_2$ is large and the other is small, either edge or line exists in the area; and (3) if both $\lambda_1$ and $\lambda_2$ are large, gray scale change is also large in any direction the area moves. In other words, feature point exists in the area. Therefore, a gray scale change response function R(Z) may be set to determine whether the point is a feature point:

$$R(Z) = \det(Z) - k \cdot \text{trace}^2(Z) \quad (4)$$

$$= \lambda_1 \lambda_2 - k \cdot (\lambda_1 + \lambda_2)^2$$

where k is a constant, det(Z) is the determinant of matrix Z, trace(Z) is the sum of the main diagonal of matrix Z. Through the computation of R, the m points with the maximum response within the entry detection window may be selected as feature points, and a time stamp is assigned to the feature points as the basis for subsequent tracking and grouping.

Figure 9B:
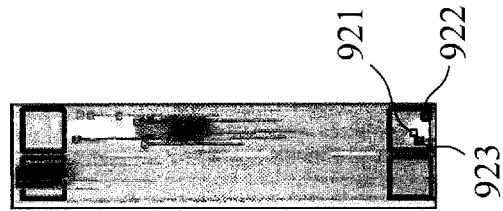
FIGS. 9A-9B show an exemplary schematic view of performing feature point detection at the entry detection window, consistent with certain disclosed embodiments.
Figure 9A:
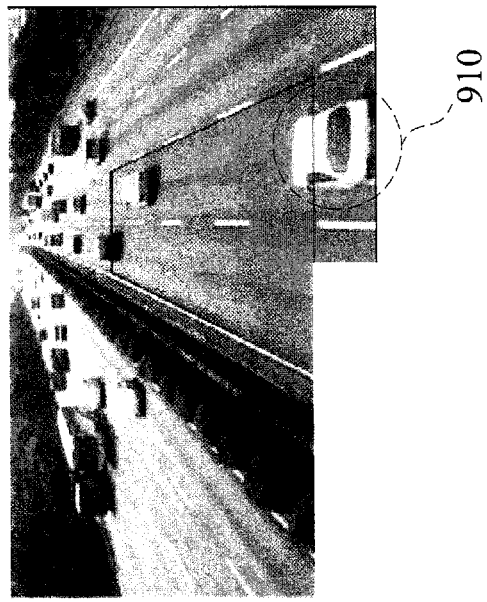

FIGS. 9A-9B show an exemplary schematic view of performing feature point detection at the entry detection window, consistent with certain disclosed embodiments. As shown in the bird's eye view in FIG. 9A, when the entry detection window at the right vehicle lane detects a vehicle passing event, shown as dashed line circle 910. The exemplary embodiments may immediately use Harris detection technology to detect three feature points, shown as three little squares 921-923 within entry detection window 920 of FIG. 9B. The centers of squares 921-923 are the locations of three detected feature points.

After the features points in the entry detection window are detected, the exemplary embodiments may use optical flow technology to estimate the locations of all the detected feature points within the next frame of image. This is the feature point tracking. The theory of tracking is described as follows.

Assume that the same feature point $p_i$ shows appearance invariant in the image frames at time t and t+1, i.e., $I_t(x,y) = I_{t+1}(x+u, y+v)$, where (u,v) is the displacement vector of the point. Through Taylor expansion, the above equation can be expressed as:

$$I_{t+1}(x + u, y + v) \approx I_{t+1}(x, y) + \frac{\partial I}{\partial x} u + \frac{\partial I}{\partial x} v \quad (5)$$

Because the point satisfies the appearance invariant characteristic, equation (5) can be derived as:

$$0 = I_{t+1}(x + u, y + v) - I_t(x, y) \quad (6)$$

$$\approx I_{t+1}(x, y) + I_x u + I_y v - I_t(x, y)$$

$$\approx (I_{t+1}(x, y) - I_t(x, y)) + I_x u + I_y v$$

$$\approx I_t + I_x u + I_y v$$

where $I_t = \partial I/\partial t$, $I_x = \partial I/\partial x$ and $I_y = \partial I/\partial y$.

Because a single equation (6) has two unknown variables u, v, hence, assume that the neighboring points to the feature point also have the same displacement vector and take the feature point as a center of n×n window, equation (6) can be expanded as:

$$\begin{bmatrix} I_x(p_1) & I_y(p_1) \\ I_x(p_2) & I_y(p_2) \\ \ldots & \ldots \\ I_x(p_{n^2}) & I_y(p_{n^2}) \end{bmatrix} \begin{bmatrix} u \\ v \end{bmatrix} = - \begin{bmatrix} I_t(p_1) \\ I_t(p_2) \\ \ldots \\ I_t(p_{n^2}) \end{bmatrix} \quad (7)$$

Figure 10:
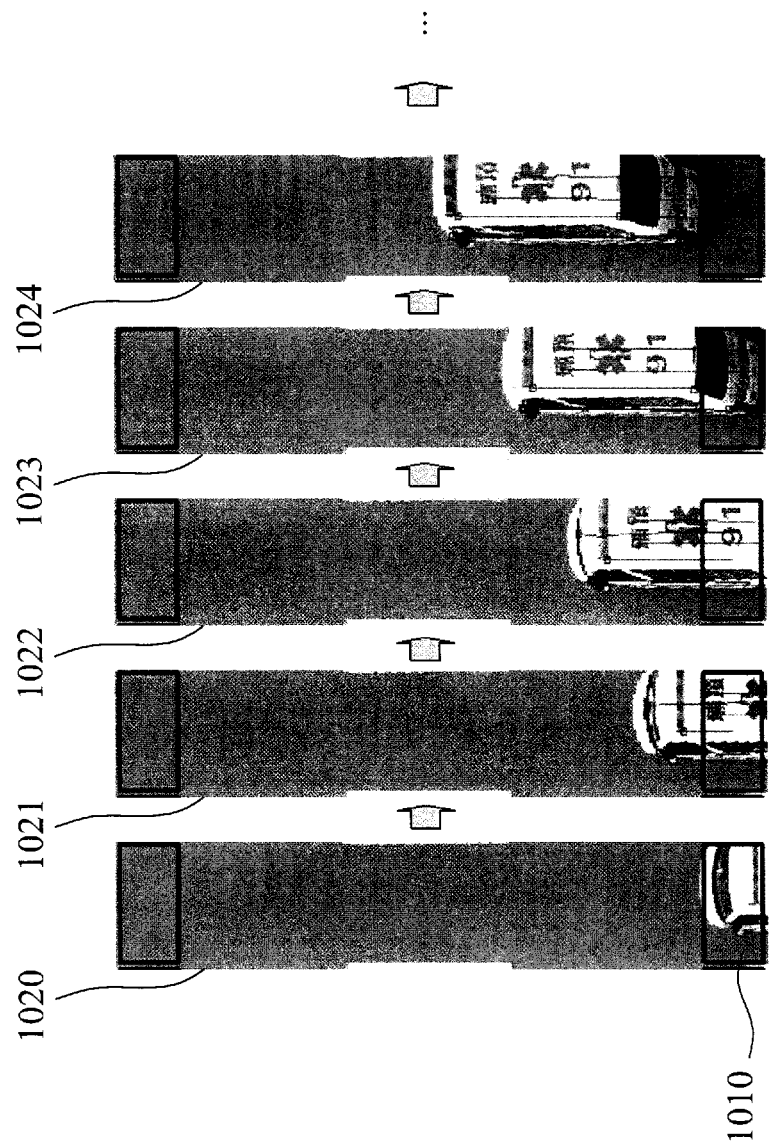
FIG. 10 shows an exemplary schematic view of tracking the locations of all the detected feature points in a plurality of temporal successive image frames, consistent with certain disclosed embodiments.

In this manner, the u and v of equation (7) may be solved by the least square sum, i.e., the displacement vector of the feature point, and further induce to obtain the location in the next image frame. FIG. 10 shows an exemplary schematic view of tracking the locations of all the detected feature points in a plurality of temporal successive image frames, consistent with certain disclosed embodiments. As may be seen from FIG. 10, feature point tracking is done frame by frame, starting with image frame 1020 at time, say t0, when entry detection 1010 is detected to have a vehicle passing event occurring, followed by subsequent image frames 1021, 1022, 1023, 1024, and so on at time t0+1, t0+2, t0+3, t0+4, and so on, continuously tracking the locations in these image frames.

Figure 11:
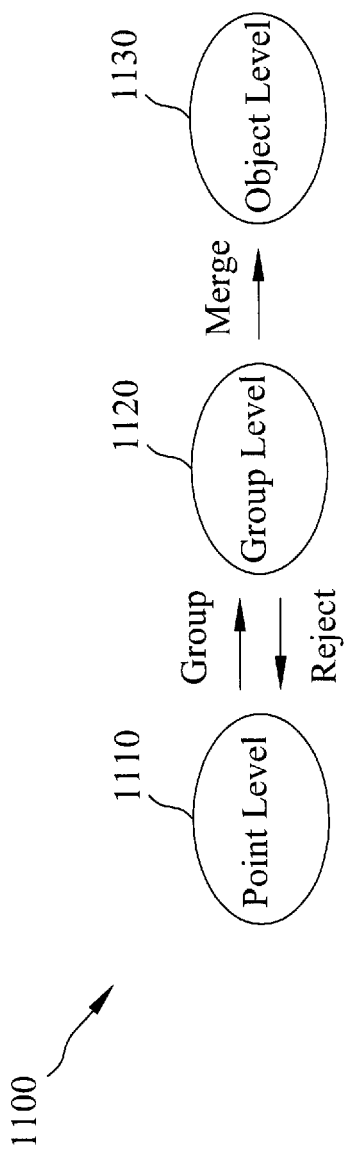
FIG. 11 shows an exemplary schematic view of a hierarchical feature point grouping architecture, consistent with certain disclosed embodiments.

Through feature point detection and tracking module, the exemplary embodiments may find the feature points of a moving car and track the movement. However, it is worth noting that at this point, which car these feature points should belong to is not known yet. Hence, the feature point grouping module 440 of the exemplary embodiments uses a hierarchical feature point grouping architecture to merge the feature points of the same car to obtain the tracking result of a single vehicle. The hierarchical feature point grouping architecture 1100 is shown in FIG. 11, starting with feature points at the lowest level, including a point level 1110, a group level 1120 and an object level 1130, wherein links exist between levels.

Feature point grouping module 440 operates between point level 1110 and group level 1120 via merging and rejecting, i.e., merging similar feature points and rejecting noise feature points caused by erroneous estimation. Feature point grouping module 440 operates between group level 1120 and object level 1130 using a merging strategy to merge the feature point groups with motion consistency (MC) and spatial-temporal consistency into a moving object, i.e., a single vehicle. The operations at all levels include the point-level grouping, group-level point rejection and group-level mergence, and are described as follows.

In the point-level grouping operation, after the detection by vehicle passing event detection module, the exemplary embodiments may know whether a single image frame having a car passing the entry detection window. If successive k image frames all detect a vehicle passing event, k>1, the n feature points $p_i$ detected in these k image frames may be grouped and merged into a feature point group G, with a given label. Feature point group G may be expressed as:

$$G = \{p_i(x,y) | i=1,2,\ldots,n\}$$

where x and y are the location of successively detected feature point $p_i$ in an image frame of time t. Feature point group G may be described with a two-dimensional Gaussian distribution $N_G(\mu, \sigma^2)$, i.e., the distribution of feature point $p_i$, wherein:

$$\mu = \begin{bmatrix} \mu_x \\ \mu_y \end{bmatrix}, \mu_x = \frac{1}{n}\sum_{i=1}^{n} x_i, \mu_y = \frac{1}{n}\sum_{i=1}^{n} y_i$$

$$\sigma = \begin{bmatrix} \sigma_x & 0 \\ 0 & \sigma_y \end{bmatrix}, \sigma_x = \sqrt{\frac{1}{n}(x_i - \mu_x)^2}, \sigma_y = \sqrt{\frac{1}{n}(y_i - \mu_y)^2}$$

If each feature point can be stably tracked and every vehicle passing event may be accurately and successively determined when each vehicle passing the entry detection window, the single vehicle tracking may be accomplished by tracking each feature point. However, in actual application, not all the feature points can be tracked stably and accurately, which makes the failed feature points become noise to affect the location and distribution of the feature point group. The exemplary embodiments use the aforementioned group-level rejection to solve this problem. In addition, when a vehicle is divided into two groups because of the mistake made by vehicle passing event detection module, the exemplary embodiments use group-level mergence to solve this problem.

Figure 12:
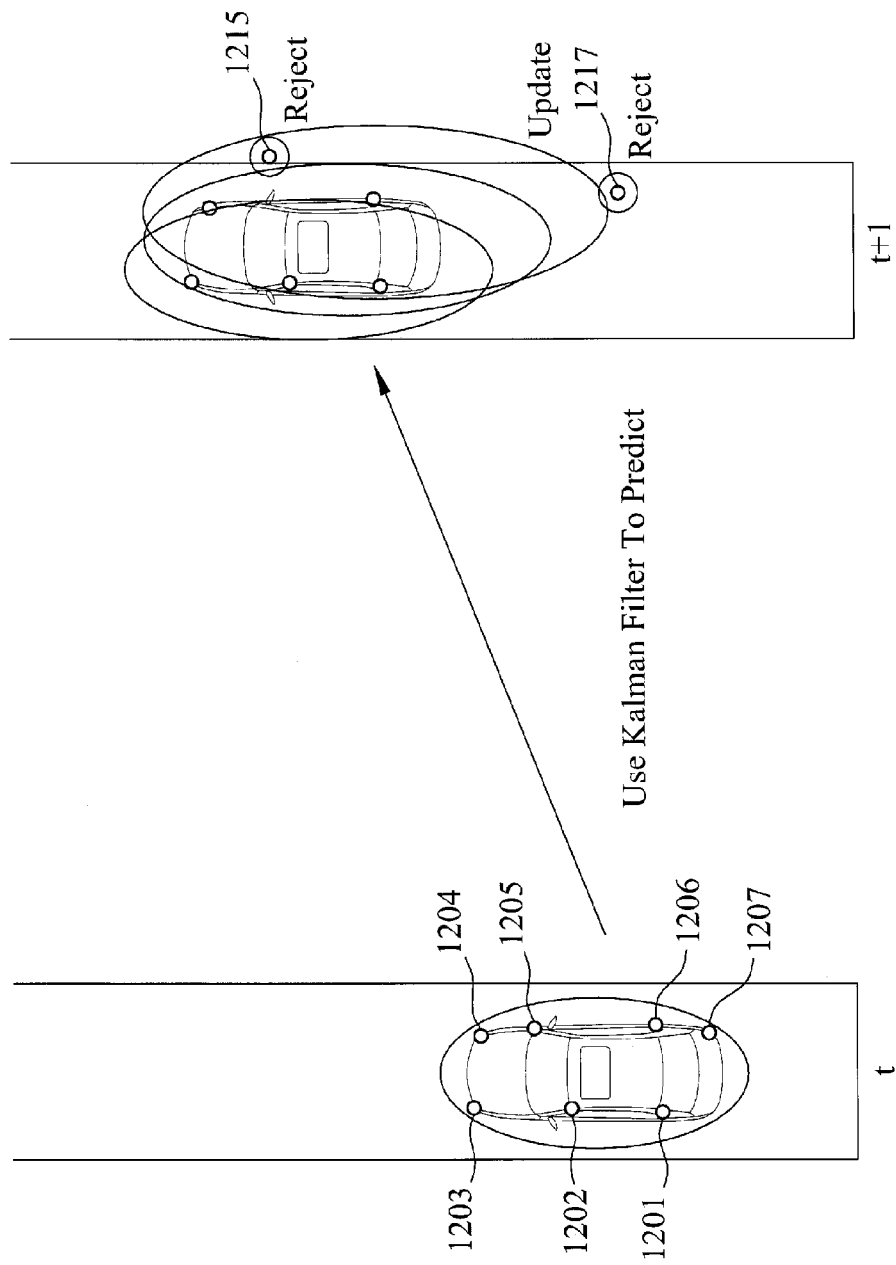
FIGS. 12A-12B show an exemplary schematic view of group-level rejection, consistent with certain disclosed embodiments.

In group-level rejection operation, as shown in FIG. 12A and FIG. 12B, the exemplary embodiments uses a Kalman filter to track each feature point group of group level 1120, where the motion model of the vehicle is assumed as constant velocity and the state model of each feature point group G is as:

$$x_G = [\mu_x, \mu_y, \sigma_x, \sigma_y, v_x, v_y]$$

with $\mu_x$, $\mu_y$, $\sigma_x$, $\sigma_y$ as the mean and standard deviation of the Gaussian distribution of feature point group G, and $v_x$, $v_y$ as the vehicle velocity at x and y direction. The prediction and update functions of Kalman filter are used as the basis for feature point rejection.

In FIG. 12A, feature point group G includes seven detected feature points 1201-1207 up to time t. Based on the measurement prior to time t, Kalman filter is used to predict the state at time t+1 and the prediction is updated according to the measurement at time t=1. In FIG. 12B, at time t+1, the feature points satisfying the following condition is considered as outliers and is rejected according to Mahalanobis distance (MD):

$$MD(\hat{x}_G^{t+1}, p^{t+1}(x,y)) = \sqrt{\frac{(x-\hat{\mu}_x)^2}{\hat{\sigma}_x^2} + \frac{(y-\hat{\mu}_y)^2}{\hat{\sigma}_y^2}} > 3,$$

where 3 is a threshold. In this example, after the prediction and updating by Kalman filter, feature points 1205, 1207 of group G detected at time t are considered as outliers 1215, 1217 and rejected at time t+1 after update, as shown in FIG. 12B.

In the group-level mergence operation, a car might be divided into two or more feature groups because of the mistake made by vehicle passing event detection module. The exemplary embodiments take the motion consistency $MC(G_p, G_q)$ and spatial-temporal consistency $ST(G_p, G_q)$ of two neighboring groups $G_p$ and $G_q$ into account, and merges these two groups into an object if the following condition is satisfied:

$$w \cdot MC(G_p, G_q) + (1-w) \cdot ST(G_p, G_q) > \gamma$$

where w is a weight variable, γ is a threshold set by the user. The definition of MC and ST are described as follows.

Figure 13:
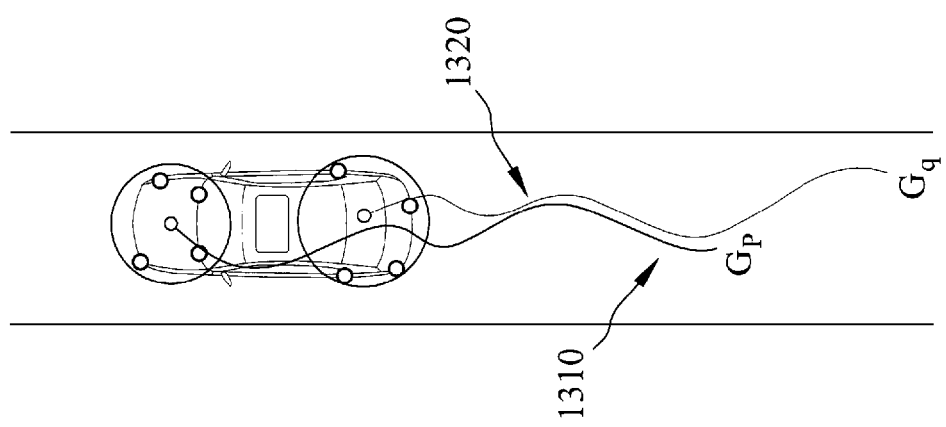
FIG. 13 shows an exemplary schematic view of trajectories of two groups, consistent with certain disclosed embodiments.

When two feature groups actually belong to the same vehicle, the trajectories of these two groups, for example, shown as trajectory 1310 of group $G_p$ and trajectory 1320 of group $G_q$ in FIG. 13, are consequentially similar. Therefore, the cross correlation of the moving distances of these two trajectories of two groups in the past duration n is computed as the MC of the two groups as the following:

$$MC(G_p, G_q) = \sum_{i=t-n+1}^{t} \frac{(d_p^i - \bar{d}_p)(d_q^i - \bar{d}_q)}{n\sigma_p\sigma_q}$$

where t is the current time, $d^i$ is the moving distance between time i−1 and i, $\bar{d}$ is the average moving distance of the trajectory between two neighboring time points, and the standard deviation σ of average moving distance $\bar{d}$ is defined as the following:

$$d^i = \sqrt{(x^i - x^{i-1})^2 + (y^i - y^{i-1})^2},$$

$$\bar{d} = \frac{1}{n}\sum_{i=t-n+1}^{t} d^i,$$

$$\sigma = \sqrt{\frac{1}{n}(d^i - \bar{d})^2}.$$

On the other hand, when two groups actually belong to the same vehicle, the time of appearance and the spatial location are consequentially close, which is the spatial-temporal consistency. Spatial-temporal consistency $ST(G_p, G_q)$ may be obtained by the following equation:

$$ST(G_p, G_q) = \begin{cases} FR(G_pG_q), & G(G_p, G_q) < D_{max} \\ 0, & \text{otherwise} \end{cases}$$

wherein for the temporal consistency, only two groups appearing successively are considered, and distance constrain condition is added. That is, if two groups belong to the same vehicle, the Euclidean length $D(G_p, G_q)$ must be less than a maximum distance $D_{max}$, where FR is the foreground rate.

On the other hand, for spatial consistency, the description is the distance between the two groups in the Euclidean space. Theoretically, the closer the groups are, the higher probability the two groups should be merged. However, in actual application, the distance between two neighboring (i.e., front and rear) cars in the lane may be smaller than the distance between the two groups belonging to the same bus (i.e., the length of a bus is longer). Therefore, if only the Euclidean distance is taken into account, the spatial consistency would be distorted. Hence, the present exemplary embodiments replace the spatial consistency of two groups with the foreground rate, as the following:

$$FR(G_p, G_q) = \frac{\text{Area(Foreground)}}{\text{Area}(G_p, G_q)},$$

where $\text{Area}(G_p, G_q)$ is the area between $G_p$ and $G_q$, and Area(foreground) is the area of the moving foreground.

Many conventional techniques are developed to determine the foreground moving objects, such as, by constructing the background model of Gaussian Mixture Model (GMM). One of the exemplary embodiments obtains the front edge of the detection line of the entry detection window to construct the background model, uses the subtraction of the background model of the current pixel group of the edge to determine whether the any pixel on that edge belongs to a foreground moving object, and uses GMM to realize. The construction of GMM background model uses a multi-dimensional GMM to approximate the color distribution of each pixel of the edge on the temporal axis. The multi-dimension refers to the three components of R, G, B as the feature vectors of the model. After the background model is constructed, each pixels of that edge in each inputted image frame is compared to the corresponding background model. If matching the background model, the pixel is determined as belonging to background; otherwise, as belonging to foreground moving object.

FIGS. 14A-14B show an exemplary schematic view of foreground rate computation, consistent with certain disclosed embodiments. FIG. 14A shows an exemplary result of a vehicle passing event detection, and FIG. 14B shows the detection result of moving foreground and the computation result of foreground rate, wherein $D_{max}$ is assumed to be 10 m. For example, $FR(G_{10}, G_9)$ is 0.28, $FR(G_9, G_8)$ is 0.96 and $FR(G_8, G_7)$ is 0.01.

The conventional approach to compute the average speed in a vehicle lane is to compute the time shift t with the maximum correlation between the signals detected at the entry point and the exit point after setting the detection window or detection line at the entry point and the exit point. The time shift indicates the time required to move from the entry point to the exit point in the current vehicle lane. The estimation of average traffic time $ATT_1$ may be obtained by maximizing the following:

$$ATT_1 = \arg\max_t \frac{1}{N}\sum_{n=0}^{N-1} x_{Exist}(n)x_{Entry}(n-t)$$

where N is the signal observation length, $x_{Exit}(t)$ and $x_{Entry}(t)$ are the signal information observed at time t at exit point and entry point respectively. However, if the vehicles appearing at a near constant frequency, such as, all the vehicles maintain constant speed and constant distance, the maximization rule may lead to local solution, resulting in erroneous estimation of average traffic speed.

Therefore, the exemplary embodiments combine the vehicle tracking information to solve the local solution problem to improve the accuracy of average traffic speed. FIGS. 15A-15B show an exemplary schematic view of average traffic time estimation method, consistent with certain disclosed embodiments. FIG. 15A shows cross-sectional views 1510, 1512 of entry detection window and exit detection window of the vehicle lane, and FIG. 15B shows the signals detected at the entry point and the exit point. The average traffic time $ATT_2$ are obtained by the following:

$$ATT_2 = \arg\max_t (w_1 CC(t) + w_2 S(t)), \text{ and}$$

$$CC(t) = \frac{1}{N}\sum_{n=0}^{N-1} x_{Exist}(n)x_{Entry}(n-t),$$

$$S(t) = \frac{1}{M}\sum_{m=1}^{M} e^{-(\Delta O_m - t)},$$

$$\Delta O_m = O_{m,2} - O_{m,1},$$

where M is the number of vehicles co-exists in the historic images of two detection windows, $O_{m,Entry}$ and $O_{m,Exit}$ are the time at which the m-th vehicle appearing at the entry point and the exit point respectively, $w_1$ and $w_2$ are the weight, $O_{m,k}$ is the time stamp of the i-th tracking object in ROI k, CCT represents the correlation of the observed signals at the entry and exit detection windows, and S is the similarity of the average vehicle traffic time. In other words, the exemplary embodiments combine the correlation of the observed signals at the entry and exit detection windows with the similarity of the average vehicle traffic time on the lane to estimate the average speed on the vehicle lane.

Figure 16:
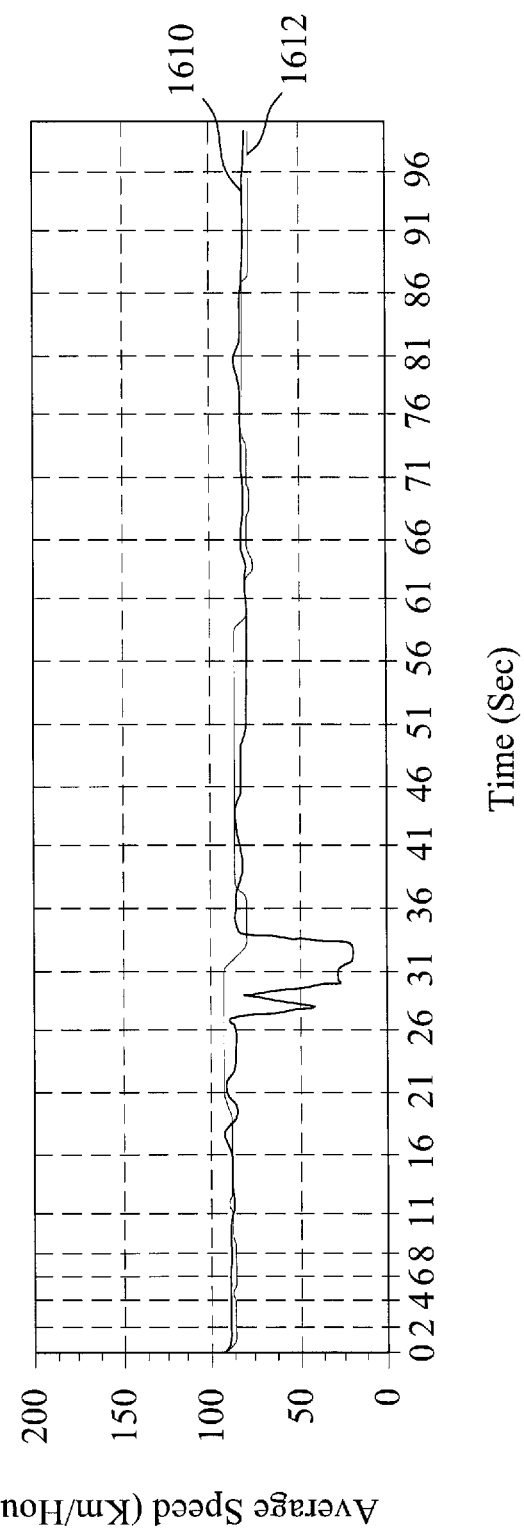
FIG. 16 shows a comparison result of two average traffic time estimation methods tested on a smooth traffic video, consistent with certain disclosed embodiments.

For the test result on a smooth traffic video, FIG. 16 compares the aforementioned two methods of estimating average speed, with x-axis as time and y-axis as the estimated average speed. Curve 1610 is obtained by conventional $ATT_1$ equation and curve 1612 is obtained by $ATT_2$ of the disclosed exemplary embodiments. As may be seen from FIG. 16, during 26-36 second, the conventional method of using observation correlation generates unstable and erroneous estimation, but the disclosed exemplary embodiments provide stable estimation by combining vehicle tracking in estimation. In other words, the disclosed exemplary embodiments improve the stability of average speed estimation with temporal correlation of entry and exit detection windows by using the vehicle tracking result.

With the operations of vehicle passing event detection module 420, feature point detection and tracking module 430 and feature point grouping module 440, and the stability of temporal correlation analysis of entry and exit detection windows, traffic parameter estimation module 450 may provide a variety of traffic parameter estimations, such as, vehicle count, traffic flow density, safety distance detection, single vehicle speed detection, lane change event detection, (shoulder) parking, average speed, and so on, with more stable and accurate result. The following describes these various traffic parameter estimations.

The disclosed exemplary embodiments may use the vehicle passing event detection module to count the number of vehicles in a vehicle lane. Through the use of feature point grouping module, the disclosed exemplary embodiments may effectively improve the accuracy of counting. The vehicle passing frequency may also be obtained by the vehicle passing event detection module, and the traffic flow density D may be computed as $N_C/N$, where N is the time length that the system configures to record the observation history and $N_C$ is the total time of the vehicle passing events during N. The vehicle passing event detection module may also be used to compute the distance between two vehicles, that is, to determine whether the two successive vehicles maintain a safety distance. Feature point detection and tracking module 430 and feature point grouping module 440 may be used to determine the time at which the vehicle appears at the entry detection window and the exit detection window, and in combination with the distance between the two detection windows, the vehicle speed may be computed. With vehicle tracking, when the trajectory of the vehicle crosses the separation line between two vehicle lanes, a vehicle lane change event is triggered. With vehicle tracking, if the vehicle does not move forward as time passes, a parking event is triggered. With the temporal correlation analysis of the entry and exit detection windows, the average speed of the vehicle lane may be computed and the accuracy of average lane speed may be improved.

Figure 17:
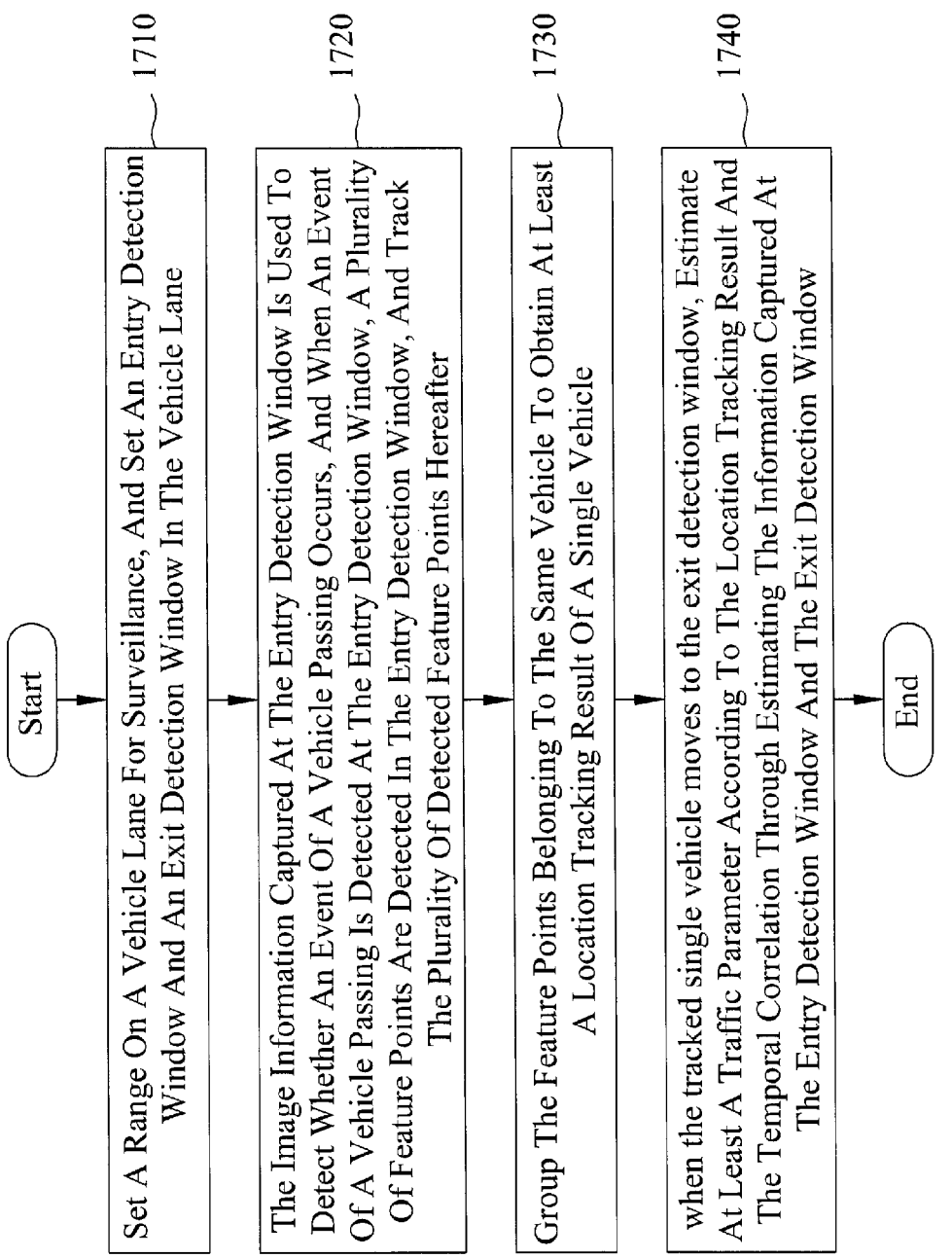
FIG. 17 shows an exemplary flowchart of an image-based detecting method for traffic parameters, consistent with certain disclosed embodiments.

FIG. 17 shows an exemplary flowchart of an image-based detecting method for traffic parameters, consistent with certain disclosed embodiments. Referring to FIG. 17, this method first sets a range on a vehicle lane for surveillance, and sets an entry detection window and an exit detection window in the vehicle lane, as shown in step 1710. In step 1720, the image information captured at the entry detection window is used to detect whether an event of a vehicle passing occurs, and when an event of a vehicle passing is detected at the entry detection window, a plurality of feature points are detected in the entry detection window, and track the plurality of detected feature points hereafter. Then, the feature points belonging to the same vehicle are grouped to obtain at least a location tracking result of a single vehicle, as shown in step 1730. When the tracked single vehicle moves to the exit detection window, at least a traffic parameter is estimated according to the location tracking result and the temporal correlation through estimating the information captured at the entry detection window and the exit detection window, as shown in step 1740.

Figure 18:
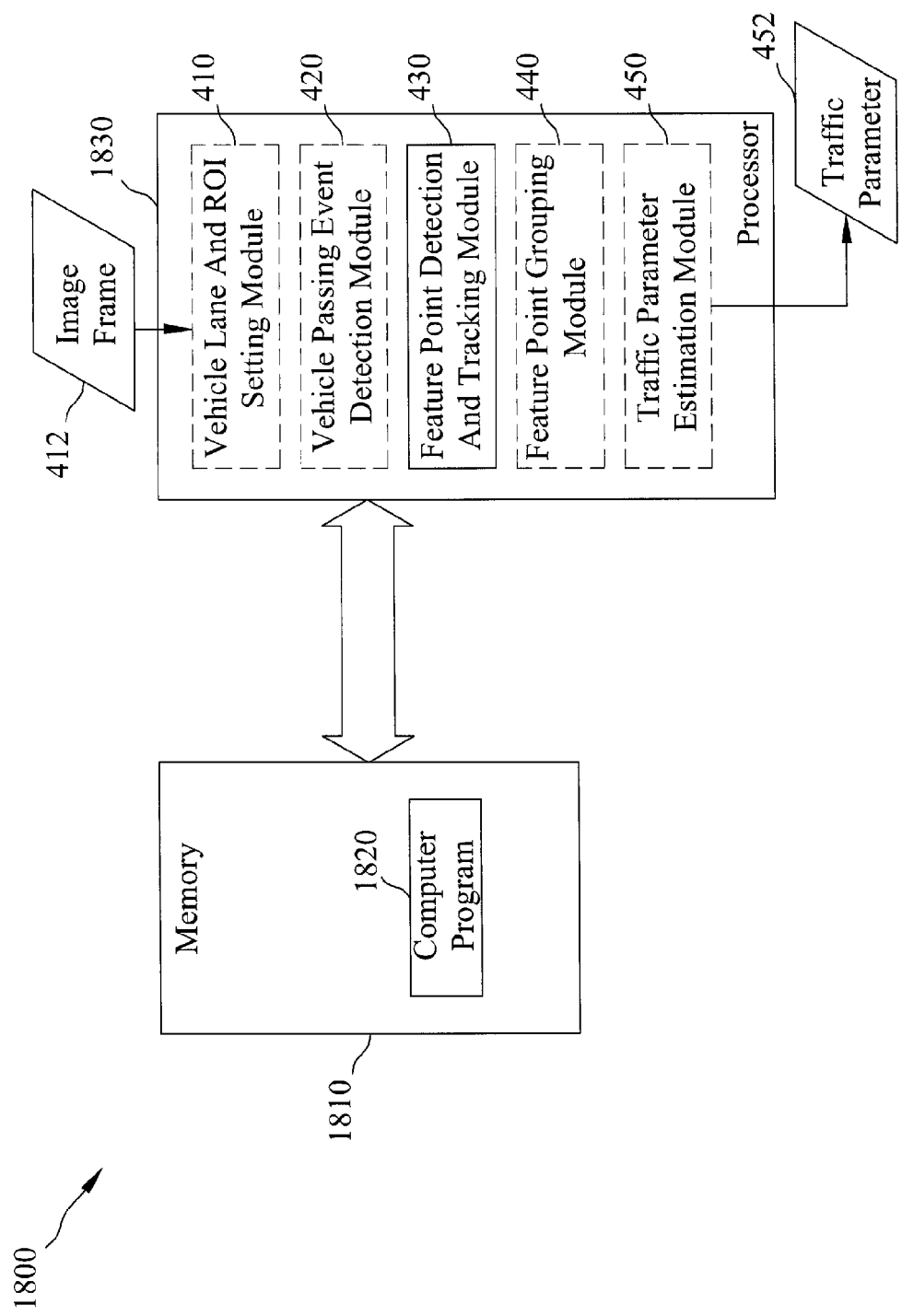
FIG. 18 shows an exemplary schematic view of a computer program product of an image-based detection for traffic parameters and application scenario, consistent with certain disclosed embodiments.

The disclosed exemplary embodiments may also be implemented with a computer program product. As shown in FIG. 18, computer program product 1800 at least includes a memory 1810 and an executable computer program 1820 stored at memory 1810. The computer program may be executed by a processor 1830 or a computer system to perform steps 1710-1740 of FIG. 17. Processor 1830 may further includes vehicle lane ROI setting module 410, vehicle passing event detection module 420, feature point detection and tracking module 430, feature point grouping module 440 and traffic parameter estimation module 450 to execute steps 1710-1740 to estimate at least a traffic parameter 452. Processor 1830 may use or further include an image capturing device to continuously capture a plurality of lane image frames.

In summary, the disclosed exemplary embodiments provide an image-based detecting technique for traffic parameters, including an image-based detecting system and method for traffic parameters and a computer program product thereof. Under the virtual wire detection method architecture, the disclosed exemplary embodiments provide a technique for feature point detection, tracking and grouping so as to have a single vehicle tracking capability and effectively estimate a plurality of traffic parameters. For example, through hierarchical feature point grouping, the accuracy of vehicle count and tracking may be improved, and the stability of average speed by temporal correlation analysis at detection windows is also improved. The traffic parameter estimation technique may be used for traffic surveillance, and real-time computing related traffic parameters, such as, vehicle detection, vehicle counting, single vehicle speed estimation, traffic flow density and illegal lane change, and so on.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An image-based detecting system for traffic parameters, comprising a processor which further includes:
   a vehicle lane region of interest (ROI) setting module, setting a monitored range on a vehicle lane, and setting an entry detection window and an exit detection window on said vehicle lane;
   a vehicle passing event detection module, detecting whether a vehicle passing event has occurred by using image information captured at said entry detection window;
   a feature point detection and tracking module, detecting a plurality of feature points detection detected within said entry detection window when a vehicle passing event is being detected, and for tracking said plurality of detected feature points by time;

a feature point grouping module, grouping a plurality of feature points to obtain a location tracking result of a single vehicle; and a traffic parameter estimation module, when a tracked single vehicle moves to said exit detection window, said traffic parameter estimation module estimating at least a traffic parameter according to said location tracking result of said single vehicle and by estimating temporal correlation of information captured in said entry and said exit detection windows;

wherein said feature point grouping module uses a hierarchical feature point grouping architecture to group feature points belonging to a same vehicle to obtain said location tracking result of said single vehicle, and said hierarchical feature point grouping architecture includes, from bottom to top, a point level, a group level and an object level, said feature point grouping module merges similar feature points and rejects erroneous noise feature points between the point level and the group level, and merges groups with motion consistency and spatial-temporal consistency into a moving object between the group level and the object level.

2. The system as claimed in claim 1, said system further includes an image capturing device for continuously capturing a plurality of lane images.

3. The system as claimed in claim 1, wherein said vehicle passing event detection module obtains an image template at said entry detection window at each time point, extracts a plurality of statistically significant feature points from each image template and uses a support vector machine (SVM) classifier to classify the obtained image templates into three different classes including vehicle, shadow and road.

4. The system as claimed in claim 3, wherein said plurality of statistically significant feature points include at least three gray scale based features and two edge based features.

5. The system as claimed in claim 3, wherein said SVM classifier includes at least a first level SVM classifier and a second level SVM classifier, said first level SVM classifier divides said obtained image templates into road or non-road image templates, and said non-road image templates are further divided by said second level SVM classifier into vehicle and shadow.

6. An image-based detecting method for traffic parameters, applicable to a traffic parameter detecting system, said method comprising:

setting a monitored range on a vehicle lane, and setting an entry detection window and an exit detection window in said vehicle lane;

detecting whether an event of a vehicle passing occurs by using image information captured at said entry detection window, and when said event of a vehicle passing is detected at said entry detection window, detecting a plurality of feature points in said entry detection window and tracking said plurality of feature points being tracked hereafter;

grouping said feature points belonging to a same vehicle to obtain at least a location tracking result of a single vehicle; and estimating at least a traffic parameter when said single vehicle moves to said exit detection window, according to said location tracking result and temporal correlation through estimating information captured at said entry detection window and said exit detection window;

wherein said method groups feature points belonging to a same vehicle to obtain said location tracking result of said single vehicle by using a hierarchical feature point grouping architecture, and said hierarchical feature point grouping architecture includes, from bottom to top, a point level, a group level and an object level, said method merges similar feature points and rejects erroneous noise feature points between said point level and said group level, and merges groups with motion consistency and spatial-temporal consistency into a moving object between said group level and said object level.

7. The method as claimed in claim 6, wherein operations between levels of said hierarchical feature point grouping architecture include point-level grouping, group-level rejection, and group-level mergence.

8. The method as claimed in claim 7, wherein said point-level grouping further includes:

when a vehicle passing event is detected in a plurality of successive image frames, grouping a plurality of feature points detected by said plurality of successive image frames into a feature point group.

9. The method as claimed in claim 7, wherein said group-level rejection further includes:

tracking each feature point group of said group level through a Kalman filter; and rejecting a feature point by using prediction and updating capabilities of said Kalman filter and by using a distant equation condition as a basis.

10. The method as claimed in claim 7, wherein said group-level mergence further includes:

taking motion consistency $MC(G_p, G_q)$ and spatial-temporal consistency $ST(G_p, G_q)$ of two neighboring groups $G_p$, $G_q$ into account; and a condition for merging groups $G_p$ and $G_q$ into an object being:

$$w \cdot MC(G_p, G_q) + (1-w) \cdot ST(G_p, G_q) > \gamma$$

wherein w is a weight variable, and y is a threshold set by a user.

11. The method as claimed in claim 10, wherein said group-level mergence further includes:

computing cross correlation of moving distances of trajectories of two groups $G_p$, $G_q$ during a past duration as $MC(G_p, G_q)$.

12. The method as claimed in claim 10, wherein said group-level mergence further includes:

expressing $ST(G_p, G_q)$ as a foreground rate $FR(G_p, G_q)$, and said foreground rate $FR(G_p, G_q)$ being equal to (foreground area)/(area between $G_p$ and $G_q$).

13. The method as claimed in claim 6, wherein said method further includes:

combining correlation of signals observed at said entry and said exit detection windows and similarity of average vehicle traffic time of said vehicle lane to estimate average speed on said vehicle lane.

* * * * *